Aug. 31, 1965  A. E. GOODE ETAL  3,203,473
AIRCRAFT HEATING SYSTEM
Filed Oct. 5, 1960  2 Sheets-Sheet 2

INVENTORS
ARCHIE E. GOODE
THOMAS G. HILL

By *George C. Sullivan*
Agent

United States Patent Office 3,203,473
Patented Aug. 31, 1965

3,203,473
AIRCRAFT HEATING SYSTEM
Archie E. Goode, Decatur, Ga., and Thomas G. Hill, Glen Cove, N.Y., assignors to Lockheed Aircraft Corporation, Burbank, Calif.
Filed Oct. 5, 1960, Ser. No. 60,723
5 Claims. (Cl. 165—35)

This invention relates to an aircraft heating system, and more particularly to a system providing for control of both floor temperature and compartment temperature.

Prior methods and arrangements for such heating systems have employed heat from an overhead or above floor system only for heating compartment space; the heating of the floor, if at all, occurring in an incidental manner by means of the exhaust air, which in turn is both inadequate and insufficient from the standpoint of amount of heat available for floor heating and the control thereof. Further difficulty encountered in the prior art types of heating systems in that a condition of extreme temperature stratification occurs wherein the heated air, which is supplied either through an overhead system or supply ducts located somewhat above the floor level, results in a warm space at the level of the supply ducts and above, while the floor area, which is removed from proximity of the delivery system, will be at a substantially lower temperature.

Accordingly, it is an object of this invention to provide an aircraft heating system having provisions for controlling the floor temperature as well as the compartment space temperature.

It is a further object of this invention to provide a system for direct and positive heating of both the floor and the compartment space.

Still another object of this invention is to provide a heating system wherein the floor can be maintained at any desired and substantially uniform temperature throughout.

It is still another object of this invention to provide a heating system which reduces the temperature stratification within the compartment space by providing a more uniform temperature throughout.

Further objects and advantages of this invention will become apparent from the following description taken in connection with the accompanying drawings in which:

FIGURE 4 shows another embodiment of the distribution and mixing arrangement of the hot and cooling air of the floor heating portion of the invention depicted in the other drawings.

Generally stated, the invention comprises a system arrangement having an overhead air duct in the compartment for distribution of warm or cool air combined with a warm air distribution duct within a chamber under the floor for heating thereof. The system is arranged to receive a constant mass flow of air which is ducted to both the floor heating distribution duct and the compartment overhead distribution duct. The flow of floor heating air is controlled by a thermal responsive device in turn controlling a throttling valve governing the amount of air flow to the overhead system. An increase of floor heating air flow occurs by a closing movement of the throttle valve, while a decrease in the floor heating air flow occurs upon an opening of the throttle valve.

Figure 1:
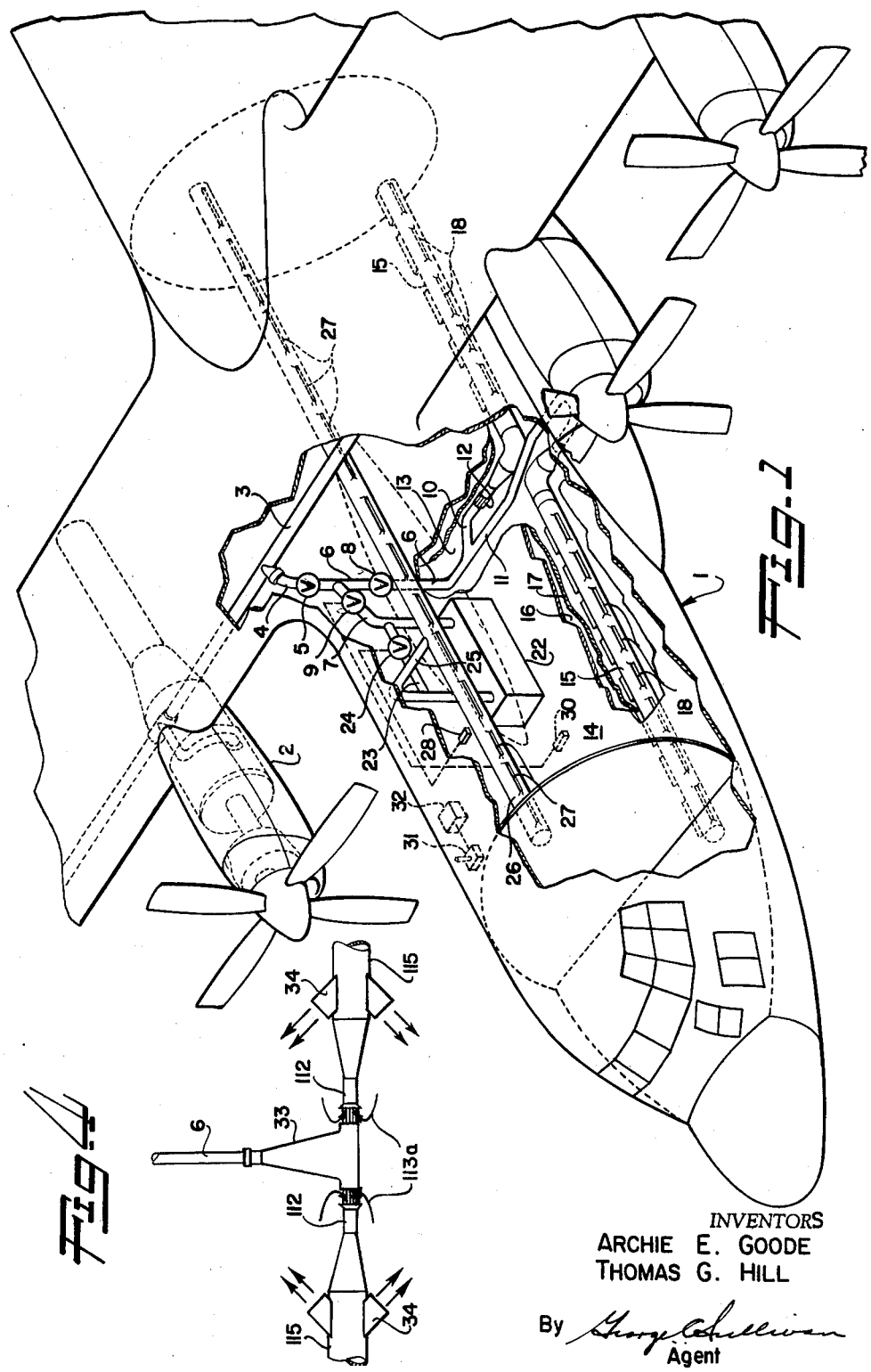
FIGURE 1 is a fragmentary perspective view of one embodiment of the present invention showing the relative relationship of the various components installed in an aircraft, some of the components of which are shown diagrammatically.
Figure 2:
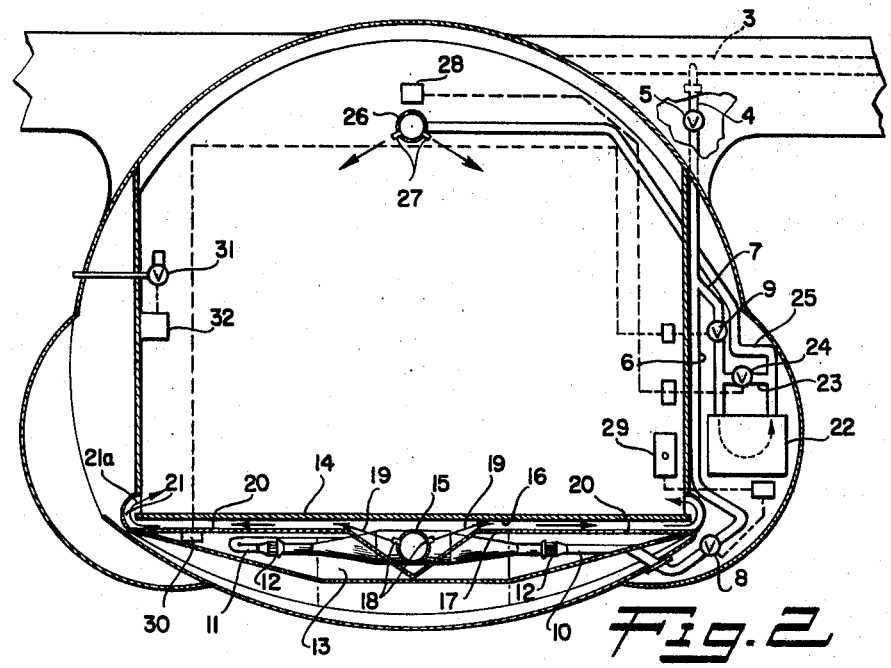
FIGURE 2 is a vertical cross section of the aircraft fuselage of FIGURE 1 showing additional relationship details of the components of the invention embodiment shown in FIGURE 1.
Figure 3:
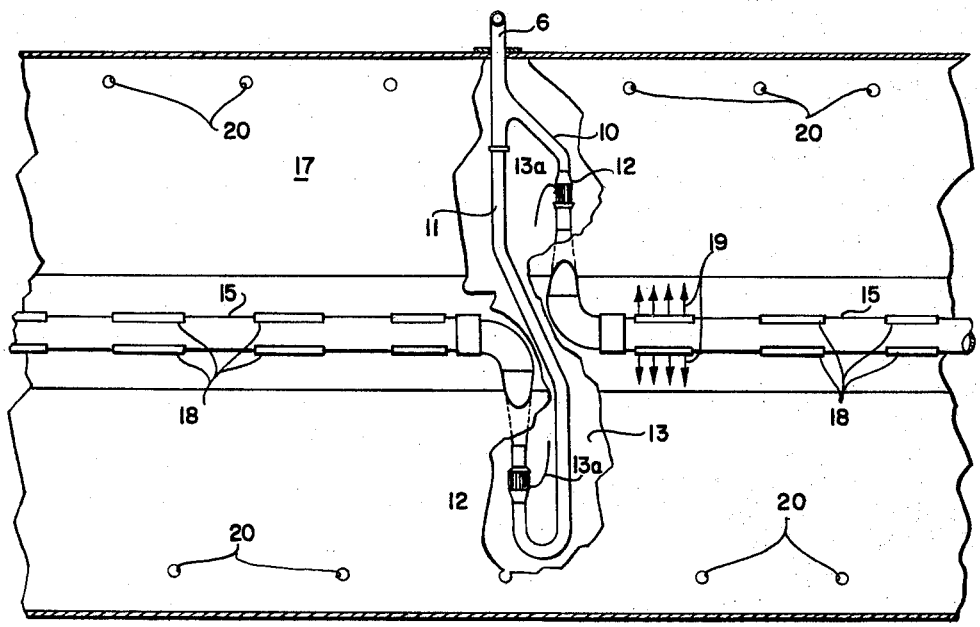
FIGURE 3 is a plan view showing the baffle and floor heating distribution ducts from the space immediately below the compartment floor.

Referring more particularly to the drawings, the preferred embodiment of the invention is shown in FIGURES 1, 2, and 3. Through an appropriate ducting arrangement hot bleed air supplied from the powerplants of aircraft 1 contained within powerplant nacelles 2 is collected in a pipe or duct 3 for introduction into the heating system through pipe or duct 4, controlled to an essentially constant mass flow rate by valve 5. Beyond valve 5 duct 4 branches into parallel ducts 6 and 7, which are in turn controlled by valves 8 and 9 respectively.

Downstream of valve 8, fluid line or duct 6 leads to a further pair of duct branches 10 and 11, each of which leads to a jet pump 12 located in a compartment 13 beneath the floor 14 of the aircraft. Jet pumps 12 are arranged to provide a mixture of the hot bleed air from duct 6 as primary fluid with entrained air from compartment 13 as a secondary fluid (this secondary air being entrained as shown by flow arrows 13a in FIGURE 3). The combined air efflux from jet pumps 12 is directed into manifolds 15 located within space 16 formed between floor 14 and baffle member 17, the baffle member 17 in turn forming the top or upper confine of compartment 13. Manifolds 15 have a plurality of distribution nozzles 18 which discharge the mixture of the primary and secondary air into space 16 for heating of the floor 14, as shown by flow arrows 19.

A portion of the air flow in space 16 returns to compartment 13 through holes or openings 20, the balance of the air flow through space 16 passing into the aircraft compartment through side or curb louvers or vents 21 as indicated by flow arrows 21a in FIGURE 2.

The bleed air flowing through duct 7 and valve 9 goes through an air conditioning unit 22 or a bypass duct 23 controlled by valve 24 into duct 25, in turn connected to an overhead manifold 26 having a multiplicity of distribution nozzles 27 for discharging the air flow from manifold 26 into the aircraft compartment. Distribution of the fluid flow in duct 7 downstream of valve 9 is controlled by valve 24 in response to thermostat or thermal control member 28 located within the aircraft compartment. Indication by thermostat 28 for more heating air to the compartment from the overhead manifold 26 results in an opening movement of valve 24, while an indication by thermostat 28 for cooler air results in a closing of valve 24 thereby forcing a larger portion of the air flow in duct 7 through air conditioning unit 22. Through modulation of valve 24 air at any desired temperature within the limits of the temperature of the bleed air and the capacity of air conditioner 22 may be delivered to the compartment from the overhead manifold 26.

The floor heating portion of the system is controlled in an on or off position by an on-off switch 29 controlling valve 8 so that if there is to be no heating of the aircraft or compartment floor, valve 8 will be closed thereby directing all air through duct 7 into the overhead system. Upon an opening of valve 8, the bleed air supply from duct 4 will divide into ducts 6 and 7, and the amount of warm bleed air passing into duct 6 in the floor heating portion of the system is controlled by the temperature of the secondary air within compartment 13 though a thermostat or thermal control member 30 located in compartment 13. Thermostat 30 controls the opening or closing of valve 9 which is in essence a reverse acting valve wherein, if the thermostat calls for a higher temperature (which means more hot bleed air should be flowing in duct 6 into the floor heating portion for the system) valve 9 will move in a closing direction while on the other hand, if the thermostat 30 calls for lower temperature heating air for the floor, the valve 9 will be opened. This reverse action of valve 9 in the overhead system is desired in preference to a direct acting valve being provided in the underfloor system to modulate temperature control from thermostat 30 because the jet pumps or ejectors 12 require that high pressure air always be available for optimum operation when valve 8 is open. Beyond valve 5 the path of least resistance when the system is in the heating configuration is through valves 9 and 24 to manifold 26 in the overhead system, rather than through valve 8 to ejectors 12 in the underfloor system. Therefore, under demand for more heat in the underfloor system, valve 9 must close to reduce the flow of bleed air to the overhead system, which in turn makes more air available to the underfloor system since valve 5 always supplies a constant quantity air, regardless of the thermostatic demands of either or both systems. Furthermore, in order to assure that the overhead system, which is the normal heating and cooling system for the aircraft, is not completely starved of air flow when the underfloor system is being operated at maximum flow, an orifice of suitable size may be provided in valve 9 to prevent complete closure of valve 9.

The amount of air flow supply to the aircraft compartment through side curbing 21 is substantially equal to the bleed air flow through valve 8 for, while there is entrainment of the air in compartment 13, a portion of the combined air flow from distribution nozzles 18 returns to compartment 13 through the openings 20. Likewise, the amount of air flow delivered to the aircraft compartment through the overhead system at manifold 26 is substantially equal to the amount of bleed air flow through valve 9.

When the system is in operation, a steady flow of air into the compartment is maintained by release of excess air through a dump valve 31 controlled by a pressure control 32 located within the compartment.

FIGURE 4 shows another jet pump or ejector arrangement for handling the bleed air from duct 6 in compartment 13. This embodiment comprises a T-section 33 having jet pump or ejector means 112 connected to manifolds 115. As the high pressure bleed air from duct 6 passes through ejectors 112, secondary air is entrained from compartment 13 as indicated by flow arrows 113a, the entrained secondary air being replenished by discharge of a mixture of primary and secondary air from manifolds 115 through angulated nozzles 34 located on manifolds 115 between the ejectors 112 and distribution nozzles discharging the combined primary and secondary air into the space 16 beneath the floor. This arrangement is provided to dispense with the need or necessity of openings 20 in baffle 17 as can best be seen in FIGURES 2 and 3.

Thus it can be seen that with this invention an aircraft heating system is provided wherein warm air is provided at a controlled temperature for heating the floor of the compartment before the air flows into the compartment as well as a warm air delivery is concurrently supplied to the compartment from an overhead system thus heating the compartment floor and supplying warm air to the compartment in such a manner as to avoid any temperature stratifications therein.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

We claim:

1. A warm air heating system for an aircraft compartment comprising: a pressurized hot air source, a two branch duct means connected to said air source for receiving a flow of hot air therefrom, the entire flow into the two branch duct means being pressurized hot air from said air source, a first air distribution means beneath the compartment floor for heating thereof and connected to one of the branch ducts to receive a portion of the air flow therefrom, air flow discharge means proximate the floor level of the compartment passing at least some of the air flow from said first air distribution means into the compartment, a second air distribution means located at a level above the compartment floor, said second air distribution means connected to the other duct branch for discharging the remaining portion of the air flow into the upper portion of the compartment, a throttling valve in said other duct branch controlling the relative air flow portions in the two branches of the duct means, and means thermally responsive to the underfloor air flow adjusting the throttling valve to vary the relative air flows through the first and second air distribution means.

2. A warm air heating system for an aircraft compartment comprising: a pressurized hot air source, a two branch duct means connected to said air source and receiving a flow of hot air therefrom, the entire flow into the two branch duct means being pressurized hot air from said air source, a chamber located beneath the floor of the compartment and spatially located therefrom to provide a space between the compartment floor and chamber, one of the branch ducts connected to the chamber for delivering a portion of the air flow thereto, a first air distribution means within the space beneath the compartment floor for heating the floor and connected to the chamber to receive an air flow therefrom of a mixture of hot air delivered by the one branch duct and cooler ambient air within the chamber, passages communicating between the chamber and space through which a portion of the air flow discharge from the first air distribution means into said space can return to the chamber, said return air flow to the chamber being the cooler ambient air within the chamber mixed with the air flow from said first branch duct, air flow discharge means proximate the floor level of the compartment passing at least some of the mixed air flow from said space into the compartment, a second air distribution means located at a level above the compartment floor, said second air distribution means connected to the other duct branch for discharging the remaining portion of the air flow into the compartment at a level higher than the compartment floor, a throttling valve in the other duct branch controlling the relative air flow portions in the two branches of the duct means, and means thermally responsive to the chamber air flow for adjusting the throttling valve to vary the relative air flows through the first and second air distribution means.

3. A warm air heating system for an aircraft compartment comprising: a pressurized hot air source, a two branch duct means connected to said air source and receiving a flow of hot air therefrom, the entire flow into the two branch duct means being pressurized hot air from said air source, a chamber located beneath the floor of the compartment and spatially located therefrom to provide a space between the compartment floor and chamber, one of the branch ducts leading to the chamber interior for carrying a portion of the hot air flow thereto, a first air distribution means within the space beneath the compartment floor and having an inlet duct leading to the chamber by passing through the chamber wall from said space, said one branch duct and said distribution means inlet duct interconnected within said chamber by a jet pump ejector means providing a mixture of the portion of hot air flow and compartment ambient air by aspiration into said distribution means inlet duct, said air mixture discharged from said first air distribution means in said space for heating the compartment floor, openings in the chamber wall providing return passage means for a portion of the discharged air mixture to return to said compartment as replacement of the aspirated ambient air therefrom, means proximate the floor level of the compartment passing at least some of the balance of said discharged air mixture into the compartment, a second air distribution means located at a level above the compartment floor, said second air distribution means connected to the other duct branch for discharging the remaining portion of the air flow into the compartment at a level higher than the compartment floor, a throttling valve in the other duct branch controlling the relative air flow portions in the two branches of the duct means, and means thermally responsive to the chamber air flow for adjusting the throttling valve to vary the relative air flows through the first and second air distribution means.

4. A warm air heating system for an aircraft compartment comprising: a pressurized hot air source, a two branch duct means connected to said air source for receiving a flow of hot air therefrom, the entire flow into the two branch duct means being pressurized hot air from said source, a first air distribution means beneath the compartment floor for heating thereof and connected to one of the branch ducts to receive a portion of the air flow therefrom, air flow discharge means proximate the floor level of the compartment passing at least some of the air flow from said first air distribution means into the compartment, said other duct branch connected to an air cooling means, a second air distribution means located at a level above the compartment floor and connected to said air cooling means, a valve controlled by-pass means interconnecting said other duct branch and said second air distribution means to by-pass the remaining portion of air flow through said other duct branch around said air cooling means for delivery of hot air directly to said second air distribution means for discharging said remaining portion of the air flow into the compartment at a level higher than the compartment floor, first thermally responsive means within the compartment adjusting the by-pass control valve to vary the relative air flows through the air cooling means and by-pass, a throttling valve in the said other duct branch upstream of the by-pass connection to said other duct branch, said throttling valve controlling the relative air flow portions in the two branches of the duct means, and second means thermally responsive to the underfloor air flow adjusting the throttling valve to vary the relative air flows through the first and second air distribution means.

5. A warm air heating system for an aircraft compartment comprising: a pressurized hot air source, a two branch duct means connected to said air source and receiving a flow of hot air therefrom, the entire flow into the two branch duct means being pressurized hot air from said air source, a chamber located beneath the floor of the compartment and spatially located therefrom to provide a space between the compartment floor and chamber, one of the branch ducts leading to the chamber interior for carrying a portion of the hot air flow thereto, a first air distribution means within the space beneath the compartment floor and having an inlet duct leading to the chamber by passing through the chamber wall from said space, said one branch duct and said distribution means inlet duct interconnected within said chamber by a jet pump ejector means providing a mixture of the portion of hot air flow and compartment ambient air by aspiration into said distribution means inlet duct, said air mixture discharged from said first air distribution means in said space for heating the compartment floor, openings in the chamber wall providing return passage means for a portion of the discharged air mixture to return to said compartment as replacement of the aspirated ambient air therefrom, said other duct branch connected to an air cooling means, a second air distribution means located at a level above the compartment floor and connected to said air cooling means, means proximate the floor level of the compartment passing at least some of the balance of said discharged air mixture into the compartment, a valve controlled by-pass means interconnecting said other duct branch and said second air distribution means to by-pass the remaining portion of the air flow through said other duct branch around said air cooling means for delivery of hot air directly to said second air distribution means for discharging said remaining portion of the air flow into the compartment at a level higher than the compartment floor, first thermally responsive means within the compartment adjusting the by-pass control valve to vary the relative air flows through the air cooling means and by-pass, a throttling valve in the said other duct branch upstream of the by-pass connection to said other duct branch, said throttling valve controlling the relative air flow portions in the two branches of the duct means, and second means thermally responsive to the underfloor air flow adjusting the throttling valve to vary the relative air flows through the first and second air distribution means.

References Cited by the Examiner
UNITED STATES PATENTS

| 2,215,901 | 9/40 | Christman | 165—109 X |
| 2,232,587 | 2/41 | Brandt | 165—16 |
| 2,551,697 | 5/51 | Palmatier | 165—42 X |
| 2,815,938 | 12/57 | Impey et al. | 165—96 X |
| 2,876,998 | 3/59 | Csabi | 237—12.3 |

CHARLES SUKALO, *Primary Examiner.*

HERBERT L. MARTIN, PERCY L. PATRICK,
*Examiners.*